United States Patent [19]

Fortson

[11] Patent Number: 5,238,583
[45] Date of Patent: Aug. 24, 1993

[54] METHOD FOR CONVERTING A CONTAMINATED WASTE MATERIAL TO AN INNOCUOUS GRANULAR SUBSTANCE

[75] Inventor: Francis M. Fortson, Lafayette, La.

[73] Assignee: Derrick's Enterprise, Inc., Lafayette, La.

[21] Appl. No.: 848,664

[22] Filed: Mar. 9, 1992

[51] Int. Cl.$^5$ ............................................. C02F 11/14
[52] U.S. Cl. ..................................... 210/751; 210/766
[58] Field of Search .................. 210/751, 770, 766; 405/129

[56] References Cited

U.S. PATENT DOCUMENTS 4,781,842  11/1988  Nicholson ........................ 210/751
5,051,031  9/1991  Schumacher et al. ............ 405/129

*Primary Examiner*—Ivars Cintins
*Attorney, Agent, or Firm*—William David Kiesel; Robert C. Tucker; Warner J. Delaune

[57] ABSTRACT

A method for converting a contaminated waste material which is not environmentally acceptable to one that is environmentally acceptable. The waste material is mixed with an effective amount of reagent material, such as fly ash, in a containing means, such as an earthen pit. An effective amount of water is then added to cause an exothermic reaction and cause the temperature of the mixture to reach about 140° F. to about 180° F. The so-treated mixture is then allowed to dry without setting.

8 Claims, No Drawings

METHOD FOR CONVERTING A CONTAMINATED WASTE MATERIAL TO AN INNOCUOUS GRANULAR SUBSTANCE

FIELD OF THE INVENTION

The present invention relates to a method for converting a contaminated waste material, which is environmentally unacceptable, to a relatively harmless granular substance which is environmentally acceptable. The method involves mixing with said waste material, which is in the form of a sludge, a particulate treating reagent which contains an effective amount of calcium oxide and silica. An effective amount of water is added to the mixture to cause an exothermic reaction. The treated mixture is allowed to dry without setting, thereby resulting in an environmentally acceptable particulate substance.

BACKGROUND OF THE INVENTION

All industrial societies are faced with significant environmental problems associated with industrial waste materials, many of which are hazardous to both animal and plant life. Examples of such waste materials include sludges which settle as sedimentation layers at the bottom of the sea, lakes, and rivers; effluent sludges discharged from various industries including pharmaceutical, tanning, paper and pulp manufacturing, wool washing, fermenting, food processing, metal surface processing, plating, ore dressing, coal washing, and fume desulfurizing; as well as other wastes such as sewage sludges discharged from sewage processing stations, and those resulting from the refining of petroleum products. Such wastes are often contaminated with substances which can have an adverse effect on the ecological system. Contaminants found in these substances often include unacceptable levels of heavy metals such as copper, lead, cadmium, arsenic, mercury, hexavalent chromium; and other chronically toxic compounds such as PCB, PCP, DDT, 2-BHC, Dieldrin, Chlordecone, Mirex, Parathion, cyanic compounds, alkyl-mercury compounds; and the like. These waste materials are sometimes referred to herein as environmentally unacceptable.

The treatment and handling of such contaminated waste materials, many of which can be classified as hazardous, is strictly regulated by one or more governmental agency because of their potential harm to the public welfare. As such, a great deal of work has been done in recent year in developing methods for safely handling these materials and for neutralizing their troublesome characteristics so they can be safely disposed of.

Non-limiting examples of methods which have been developed and which have met with varying degrees of success include sorption, adsorption, volatilization, biodegradation, chemisorption, passivation, ion-exchange, encapsulation, and embedment through solidification into a monolith structure and stabilization of chemical constituents. Sorption involves adding a solid to the hazardous waste material to soak-up any liquid which is present. Non-biodegradable materials are typically used as the sorbent, such as activated carbon, anhydrous sodium silicate, various forms of gypsum, celite, clays, bottom ash, fly ash, fly dust, kiln ash, and cement kiln dust, expanded mica, and zeolitic materials. Biodegradable materials can also used, such as, peat moss, kenaf, rice hulls, sawdust, and the like. This treatment primarily uses biodegradation for reducing organic constituents of the waste material. The sorbent may also interact chemically with the waste material, or simply be wetted by the liquid portion and retained in the sorbent as a capillary liquid. Sorption generally cannot be used with many types of hazardous waste, such as those which contain potentially hazardous components which can be easily leached from the sorbent. This is because sorption only requires that it be mixed with the waste. Further, as governmental regulations become stricter and stricter, sorption becomes less and less attractive for meeting such regulations.

Another method for treating hazardous waste involves the consolidation and solidification of the waste into a solid block of material that has relatively high structural integrity. The resulting block is often called a monolith. The monolith can be as small as the contents of a steel drum, or it can encompass the entire waste disposal site, called a monofill. The contents of the monolith do not necessarily interact chemically with the reagents, but are usually mechanically locked within a solidified matrix, called microencapsulation. Contaminant loss is primarily limited by decreasing the surface area which is exposed to the environment and/or isolating the contaminants from environmental influences by encapsulating the waste particles. Wastes can also be microencapsulated, that is, bonded to, or surrounded by, an impervious coating.

While solidification can be very effective for treating some hazardous waste, recently passed governmental regulations are placing greater demands on this technology. This is because of the eve stricter limitations dealing with acceptable levels of leachates from the solidified block. Also, the block must withstand ever greater physical pressures without cracking and exposing contaminants to environmental influences.

Other methods of hazardous waste treatment include inorganic and organic stabilization. Unlike solidification processes, which convert wastes into a solid mass, stabilization processes either reduce the solubility, chemical reactivity, or physical entrapment of the waste. Stabilization processes typically include adjusting pH, converting metals to hydroxides, or establish oxidation-reduction conditions in the waste to prevent solubilization and/or leachability in ground water. The most commonly used inorganic stabilization processes include mixing the waste product with inorganic materials such as fly ash, cement kiln dust, lime kiln dust, hydrated lime, Portland cement, and pozzolanic materials. Stabilization processes, like solidification processes, are being pressed to meet the new stricter governmental regulations. Furthermore, stricter governmental regulations are also making on-site treatment of hazardous waste more desirable.

A typical stabilization process is taught in U.S. Pat. Nos. 4,781,842 and 4,902,431 wherein a sewage sludge is stabilized and converted to fertilizer by mixing the sludge with an alkaline material which is sufficient to raise the pH to at least 12. The mixture is then allowed to dry for at least one day. The alkaline material is selected from cement, kiln dust, and lime dust, to achieve chemical stabilization. Bulking materials, such as slag fines, fly ash, gypsum, etc. may also be added. Such a process is primarily a drying process to eliminate offensive odors and pathogenic microorganisms. The process is not capable of generating a substantial amount of heat to destroy many of contaminants.

Also, U.S. Pat. No. 4,138,269 teaches a process for treating a chlorine- and sulfur-containing production residue which reacts vigorously with water. The residue is treated with a absorbent alkaline solid and water is added to cause a exothermic reaction with the residue. The absorbent alkaline solid may be cement, quicklime, limestone, dolomite, ash, and sewage sludge ash.

Although a significant amount of work has already been done to treat contaminated waste materials, there is still a considerable need in the art for improved methods for treating and neutralizing such materials.

SUMMARY OF THE INVENTION

In accordance with the present invention there is provided a method for treating an environmentally unacceptable contaminated waste material to cause it to be environmentally acceptable, which method comprises:

(a) placing the sludge into a containing means;

(b) mixing an effective amount of a reagent material with said contaminated waste material, wherein the reagent material contains at least about 18 wt.% of calcium oxide and at least about 25 wt.% of one or more inorganic oxides selected from the group consisting of silica, alumina, and an iron oxide;

(c) mixing water with said mixture in an amount which is effective to cause an exothermic reaction so that the temperature of the mixture reaches about 140° F. to about 180° F.;

(d) allowing the so-treated mixture to dry without setting, thereby resulting in a granular substance; and (e) repeating steps (b) through (d) if the resulting granular substance of step (d) is not yet environmentally acceptable.

In a preferred embodiment of the present invention, the waste material is a flowable material and the effective amount of reagent material is at least that amount which will cause it to become non-flowable.

In another preferred embodiment of the present invention, the calcium oxide containing material is selected from the group consisting of fly ash, kiln ash, flue dust, and flue ash.

In yet other preferred embodiments of the present invention, the contaminated waste material is selected from the group consisting of sewage sludge; a biologic organic waste material; a non-biologic waste material; waste resulting from the drilling, production, and refining of petroleum materials; and waste contaminated with a naturally occurring radioactive material.

DETAILED DESCRIPTION OF THE INVENTION

Any contaminated waste material may be treated in accordance with the present invention so long as it is in the form of a sludge, or can be readily converted to a sludge by the addition or removal of water. Term "sludge", as used herein means a material which is flowable material at ordinary temperatures and about atmospheric pressure, but which has a relatively high solids content, and which can typically be pumped by conventionally pumping means. Sludges will normally have a density greater than about 9 lb/gal. Non-limiting examples of such wastes included sludges which settle as sedimentation layers at the bottom of the sea, lakes, and rivers; effluent sludges discharged from various industries including pharmaceutical, tanning, paper and pulp manufacturing, wool washing, fermenting, food processing, metal surface processing, plating, ore dressing, coal washing, and fume desulfurizing; and still other wastes, such as sewage sludges discharged from sewage processing stations, and those resulting from the drilling, production, and refining of petroleum materials. Such wastes are often contaminated with substances affecting the ecological system, including heavy metals, such as copper, lead, cadmium, arsenic, mercury, hexavalent chromium; and other chronically toxic compounds such as PCB, PCP, DDT, 2-BHC, Dieldrin, Chlordecone, Mirex, Parathion, cyanic compounds, alkyl-mercury compounds; and the like. It is also within the scope of the present invention to treat waste material which is contaminated with naturally occurring radioactive materials.

The term "contaminated waste", as used herein, means any waste material which is a sludge (flowable), or which is nonflowable and can be converted into a sludge by the addition of water, and which is environmentally unacceptable. By "environmentally unacceptable", I mean those materials which governmental regulations define as being harmful, or potentially harmful, to the ecological system pertaining to the environment and which must be disposed of in accordance with governmental laws and/or regulations. This includes wastes that in mass concentrations and with improper storage disposal, or contamination reduction through treatment, can be toxic and potentially detrimental to the well being of both animal and plant life.

In accordance with the present invention the waste material to be treated will typically not meet environmental laws and/or regulations. After treatment in accordance with the present invention, it is converted to a relatively innocuous granular substance which will meet such regulations, and will thus become environmentally acceptable. The resulting product is a granulated, or particulate, substance which when mixed with soil, will support the growth of vegetation. Furthermore, the method of the present invention can be performed on-site, thus, not requiring the transportation of contaminated substances which may be subject to even more restrictive regulations.

The waste material to be treated is placed into a containing means. Any suitable containing means may be used. Nonlimiting examples of suitable containing means include earthen pits, barges, drums, as well as any relatively large metal containers, such as those used to haul trash and dirt. The preferred container means, when treating a waste material in a holding pond, is a pit that is dug or formed within the confines of the pond. A preferred method is to damn off a section of the pond and then treat material in the damned-off section. That is, within the levee system surrounding the pond. The waste material can simply be gravity fed into the pit for treatment. It is preferred that the pit be shallow enough to allow mixing to be conducted by conventional construction equipment, such as a backhoe. Of course, a deeper pit may be dug and more elaborate mixing devices may be employed. It is preferred that all of the ingredients employed in the practice of the present invention be mixed as homogeneously as possible. In fact, before treating the waste material with the reagent material, it is preferred that the waste material itself also be mixed to disperse the ingredients which may have settled.

An effective amount of a reagent material is then mixed with the waste material or sludge. The effective amount will typically be that minimum amount needed to cause the sludge to become non-flowable. A typical flowable waste material will be a water based material which has a density for about 9 to 13.5 lb/gal. While waste materials having a density below 9 lb/gal can also be successfully treated in accordance with the present invention, it may be more economical to merely transport such materials off site for treatment by another method. A flowable material in the above density range will typically be made nonflowable by adding enough reagent material to increase its density by at least about 1.5 to 2.5 lb/gal, preferably from about 2 to 2.5 lb/gal.

The reagent material suitable for us herein will contain at least about 18 wt.%, preferably at least about 20 wt.% calcium oxide; and at least about 25 wt.%, preferably at least about 40 wt.%, and more preferably at least about 50 wt.%, of one or more inorganic oxides selected from the group consisting of silica, alumina, and an iron oxide. The remainder will usually be comprised of other inorganic materials. Non-limiting examples of such materials include fly ash, kiln dust, flue dust, and flue ash. Preferred is fly ash. Some ash and dust materials contain relatively high levels of heavy metals, such as those materials resulting from the steel industry. The reagent materials preferred for the practice of the present invention will contain relatively low levels of heavy metals. That is levels which are within environmental regulations, which will typically be a total heavy metal content of less than about 3 g/kg, preferably less that about 2 g/kg.

Fly ash is generally considered to be the finely divided ash normally separated from the stack gases in a pulverized coal-burning combustion unit. This may include any fly ash, or waste residue, which meets the requirements for a class N, C, or F pozzolan as defined in ASTM (American Society for Testing Materials) Standard C618-80. Examples of these include lignite, subbituminous and bituminous fly ashes, alumino-siliceous dusts from air pollution control equipment, electric furnace dust resulting from the steel industry, lime kiln dusts from coal fired lime kilns, and dry scrubber residues.

After mixing the reagent material with the contaminated waste and causing it to become non-flowable, an effective amount of water is added. That is, at least that amount of water which will cause the temperature of the mixture to reach about 140° F. to about 180° F. These elevated temperatures will act to decompose a substantial amount of the organic components in the waste. The amount of water used will also typically cause the mixture to become flowable again. It is to be understood that an excessive amount of water is not desirable. By excessive amount of water we mean an amount which will reduce the temperatures created by the reaction of water with the reagent material to below about 100° F. Further, too much water will also impair the curing stage.

After the water is added and heat is generated, it is important to the practice of the present invention that the mixture be allowed to dry without solidifying into a block or monolith. This can be done by moving a majority of the material to one end of the containing means and letting liquid material drain to the other end. Any subsequent treatment with reagent, should the treated waste material still be environmentally unacceptable, will be added directly to the end to which the liquid has drained. The dried treated waste material, which is now in granular, or particulate, form, is then analyzed to determine if it is, or is not environmentally acceptable. If it is, it can be removed from the pit and stacked outside of it until the last batch of waste material is treated and converted. It can then be disposed of by merely spreading it over the ground. It may also be mixed with soil and spread over an area to support the growth of vegetation. Of course, the minimum amount of dirt, or soil, needed will be that minimum amount which will rejuvenate microbial organisms and nutrients to support the growth of vegetation.

If the waste material to be treated is non-flowable, or if the particulate substance resulting from the process of the present invention is not environmentally acceptable, water is added to convert it into a sludge, or flowable material again. The procedures previously described are again repeated; that is, an effective amount of reagent material is added to make it nonflowable, water is then added to cause an exothermic reaction and heat the mixture to about 140° to 180° F., then allowing it to cool, or cure, without setting. This series of steps are repeated until the resulting dried particulate material is environmentally acceptable.

One surprising aspect of the present invention is that even after several series of treatments, the volume of the mixture does not significantly increase.

The following examples are presently for illustrative purposes only and should not be taken as limiting the present invention in any way.

EXAMPLE 1

A barge, approximately 7500 barrels in size, and containing a flowable waste material, was treated in accordance with the present invention. The barge itself was used as the containing means. The waste material, before treatment, had a flashpoint of about 128° F., and a benzene and sulfide concentration which was at unacceptable levels according to EPA limits. The density of the waste material was approximately 9.8 lb/gal to which enough fly ash was added to cause it to become non-flowable (11.8 lb/gal). The fly ash contained about 26 wt.% calcium oxide and about 61 wt.% of a mixture of $SiO_2$, $Al_2O_3$, and $Fe_2O_3$. An amount of water was added so that the temperature of the mixture increased to between about 140° F. to 180° F. The major portion of the mixture was then moved to one end of the barge, liquid residue was allowed to run to the other side, and the mixture was allowed to dry. An analysis after drying revealed that the waste material still did not meet EPA standard, and thus was still not environmentally acceptable.

Water was then added (about 9 gal/barrel of waste mixture) to lower its density to about 10 lb/gal, wherein it became flowable again. Fly ash was then added again to cause the material to become non-flowable with a density of about 11.5 lb/gal. Water was then added to cause the material to be flowable and to cause an exothermic reaction with the mixture again reaching a temperature from about 140° to 180° F. The treated material was shifted in the barge and allowed to dry without setting. Another analysis revealed that the material still did not meet EPA standards. The above treatment of water, followed by fly ash, followed by drying without setting was repeated a third time, whereupon the resulting particulate material was found to be within EPA specifications, with the flashpoint being raised to greater than 210° F. Thus, the resulting material, which was granular in nature, was made environmentally acceptable.

EXAMPLE 2

A pond of flowable waste material which was contaminated with hydrocarbons (oil and grease) to the point of being environmentally unacceptable was treated by damning a section of the pond. Waste material, which had been mixed as homogeneously as possible with construction equipment in the pond, was brought into the damned-off section. The density of the flowable waste material (sludge), before treatment, was about 9.5 lb/gal and enough fly ash was added to raise its density to about 12.5 lb/gal, thus causing it to become non-flowable. An effective amount of water was added (about 9 gal/barrel of waste mixture), wherein an exothermic reaction resulted and the temperature of mixture increased to between about 140° to 180° F. A majority of the waste mixture was then moved toward one end of the containing means and liquid was allowed to drain toward the other end. The material in the pit was allowed to dry overnight without setting, whereupon an analysis revealed that the mixture still not environmentally acceptable.

Water was then added to bring its density down to about 11.5 lb/gal, whereupon it became flowable again. Fly ash was added to bring its density up to about 12.5 lb/gas again, whereupon water was again added to make it flowable again, and to cause an exothermic reaction. The treated material was allowed to dry and an analysis revealed that the oil and grease content were reduced from about 85 wt.% of the material to about 0.1 wt.%. Concentrations of the hydrocarbons in excess of 1 wt.% are considered environmentally unacceptable.

EXAMPLE 3

The procedure of Example 2 was preformed on a flowable waste material which was contaminated with relatively high levels of heavy metals and salts. Before treatment, the zinc level was found to be about 940 mg/l (acceptable limit=500 mg/l); the barium level was in excess of 54,000 mg/l (acceptable limit=20,000 to 40,000 mg/l), and the conductivity was about 120 MMHOS/CM (acceptable limit=4 to 8 MMHOS/CM. After treatment the zinc level was reduced to about 50 mg/l, the barium level reduced to 12,6666 mg/kg, and the conductivity reduced to 6.38 MMHOS/CM.

What I claim is:

1. A method for treating an environmentally unacceptable contaminated waste material to cause it to be environmentally acceptable, which method comprises:
   (a) placing said waste material, having a density of about 9 to 13 lb/gal, into a containing means;
   (b) mixing an effective amount of a reagent material with said contaminated waste material to increase its density by at least about 1.5 lb/gal, wherein the reagent material contains at least about 18 wt.% of calcium oxide and at least about 25 wt.% of one or more inorganic oxides selected from the group consisting of silica, alumina, and an iron oxide;
   (c) mixing water with said mixture in an amount which is effective to cause an exothermic reaction so that the temperature of the mixture reaches about 140° F. to about 180° F.;
   (d) allowing the so treated mixture to dry without setting, thereby resulting in a granular substance; and
   (e) repeating steps (b) through (d) if the resulting granular substance of step (d) in not yet environmentally acceptable.

2. The method of claim 1 wherein the reagent material is selected from the group consisting of fly ash, kiln ash, flue dust, and flue ash.

3. The method of claim 2 wherein the reagent material is a fly ash.

4. The method of claim 3 wherein the fly ash contains less than about 2 g of heavy metals per kg of waste material.

5. The method of claim 1 wherein the contaminated waste material is selected from sewage sludge; a sludge resulting from the refining of petroleum feedstocks, which sludge contains heavy hydrocarbonaceous components, heavy metals, or both; a biologic organic waste material; and a material contaminated with naturally occurring radioactive material.

6. The method of claim 1 wherein the contaminated waste material is a flowable material having a density in the range of about 9 to 13 lb/gal.

7. The method of claim 6 wherein the reagent material is fly ash which is added in an amount to raise the density of the contaminated waste material by at least 2 lb/gal.

8. The method of claim 1 wherein the waste material to be treated is a non-flowable material which is first made flowable by treating it with water to bring its density to about 9 to 13 lb/gal.

* * * * *